US006894102B2

(12) United States Patent  
Merfeld

(10) Patent No.: US 6,894,102 B2
(45) Date of Patent: May 17, 2005

(54) SYNDIOTACTIC POLYSTYRENE BLENDS

(75) Inventor: Glen David Merfeld, Menands, NY (US)

(73) Assignee: General Electric, Pittsfield, MA (US)

( * ) Notice: Subject to any disclaimer, the term of this patent is extended or adjusted under 35 U.S.C. 154(b) by 404 days.

(21) Appl. No.: 10/063,853

(22) Filed: May 20, 2002

(65) Prior Publication Data
US 2003/0216503 A1 Nov. 20, 2003

(51) Int. Cl.$^7$ .................. C08K 3/140; C08L 25/06; C08L 51/00; C08F 283/06
(52) U.S. Cl. .................. 524/494; 524/504; 524/505; 524/508; 524/540; 524/904; 525/534; 525/905
(58) Field of Search .................. 524/494, 504, 524/505, 508, 540; 525/534, 905

(56) References Cited

U.S. PATENT DOCUMENTS

| 3,383,435 | A | 5/1968 | Cizek |
| 4,483,958 | A | 11/1984 | Kosaka, deceased et al. |
| 4,565,684 | A | 1/1986 | Tibbetts et al. .......... 423/447.3 |
| 4,572,813 | A | 2/1986 | Arakawa ................ 423/447.3 |
| 4,663,230 | A | 5/1987 | Tennent ...................... 428/367 |
| 4,680,353 | A | 7/1987 | Ishihara et al. |
| 4,816,289 | A | 3/1989 | Komatsu et al. .......... 423/447.3 |
| 4,876,078 | A | 10/1989 | Arakawa et al. .......... 423/447.3 |
| 4,883,177 | A | 11/1989 | Galbani |
| 4,927,535 | A | 5/1990 | Beck et al. |
| 4,946,897 | A | 8/1990 | Albizzati et al. |
| 4,972,021 | A | 11/1990 | Lee, Jr. |
| 5,024,818 | A | 6/1991 | Tibbetts et al. ............. 422/158 |
| 5,066,741 | A | 11/1991 | Campbell, Jr. |
| 5,109,068 | A | 4/1992 | Yamasaki et al. |
| 5,159,023 | A | 10/1992 | Cecchin et al. |
| 5,165,909 | A | 11/1992 | Tennent et al. .......... 423/447.3 |
| 5,165,990 | A | 11/1992 | Nakano |
| 5,169,893 | A | 12/1992 | Beck |
| 5,183,853 | A | 2/1993 | Guerra et al. |
| 5,196,490 | A | 3/1993 | Campbell, Jr. et al. |
| 5,206,197 | A | 4/1993 | Campbell, Jr. |
| 5,219,940 | A | 6/1993 | Nakano |
| 5,241,015 | A | 8/1993 | Chou |
| 5,294,685 | A | 3/1994 | Watanabe et al. |
| 5,318,839 | A | 6/1994 | Arai et al. |
| 5,326,813 | A | 7/1994 | Okada et al. |
| 5,352,727 | A | 10/1994 | Okada |
| 5,373,065 | A | 12/1994 | Kitazawa et al. |
| 5,391,603 | A | 2/1995 | Wessel et al. |
| 5,391,611 | A | 2/1995 | Funayama et al. |
| 5,412,024 | A | 5/1995 | Okada et al. |
| 5,418,275 | A | 5/1995 | Okada et al. |
| 5,420,210 | A | 5/1995 | Kitazawa et al. |
| 5,426,171 | A | 6/1995 | Huang et al. |
| 5,436,397 | A | 7/1995 | Okada |
| 5,444,126 | A | 8/1995 | Okada et al. |
| 5,460,818 | A | 10/1995 | Park et al. |
| 5,460,868 | A | 10/1995 | Yamato et al. |
| 5,502,098 | A | 3/1996 | Watanabe et al. |
| 5,543,462 | A | 8/1996 | Okada et al. |
| 5,552,480 | A | 9/1996 | Sugita et al. |
| 5,569,428 | A | 10/1996 | Nolan et al. |
| 5,589,152 | A | 12/1996 | Tennent et al. .......... 423/447.3 |
| 5,591,382 | A | 1/1997 | Nahass et al. ............. 252/511 |
| 5,612,820 | A | 3/1997 | Schrenk et al. |
| 5,683,801 | A | 11/1997 | Miura |
| 5,703,164 | A | 12/1997 | Nakano |
| 5,712,330 | A | 1/1998 | Funayama et al. |
| 5,733,823 | A | 3/1998 | Sugioka et al. |
| 5,739,200 | A | 4/1998 | Cheung et al. |
| 5,760,105 | A | 6/1998 | Okada et al. |
| 5,777,021 | A | 7/1998 | Nakano |
| 5,777,028 | A | 7/1998 | Okada et al. |
| 5,854,353 | A | 12/1998 | Knoll et al. |
| 5,889,069 | A | 3/1999 | Suh et al. |
| 5,902,850 | A | 5/1999 | Chino et al. |
| 5,914,370 | A | 6/1999 | Okada et al. |
| 5,952,431 | A | 9/1999 | Okada |
| 5,990,217 | A | 11/1999 | Nakano et al. ............. 524/423 |
| 5,990,244 | A | 11/1999 | Warakomski et al. |
| 6,005,050 | A | 12/1999 | Okada et al. |

(Continued)

FOREIGN PATENT DOCUMENTS

| EP | 0 324 398 | 1/1989 |
| EP | 0 360 968 | 4/1989 |
| EP | 0 611 802 B1 | 8/1989 |
| EP | 0 608 007 A2 | 10/1990 |
| EP | 0 356 857 | 11/1994 |
| EP | 0 924 254 A1 | 11/1998 |
| EP | 0 978 536 A1 | 7/1999 |
| EP | 1 045 003 | 10/2000 |
| EP | 1 118 639 A2 | 1/2001 |
| EP | 1 081 190 | 3/2001 |
| EP | 1 167 439 | 6/2001 |
| WO | WO 97/11123 | 3/1997 |
| WO | WO 97/11124 | 3/1997 |
| WO | WO 97/32928 | 9/1997 |
| WO | WO 98/09791 | 3/1998 |
| WO | WO 99/18284 | 4/1999 |
| WO | WO 99/28388 | 6/1999 |
| WO | WO 00/12612 | 3/2000 |
| WO | WO 00/12614 | 3/2000 |
| WO | WO 00/14156 | 3/2000 |
| WO | WO 00/39863 | 7/2000 |
| WO | WO 00/47669 | 8/2000 |
| WO | WO 00/60002 | 10/2000 |
| WO | WO 01/64412 A2 | 9/2001 |

OTHER PUBLICATIONS

JP9291208. Publication Date Nov. 11, 1997. "Flame–Retardant Resin Composition" (Abstract only).
JP9291209. Publication Date Nov. 11, 1997. "Reinforced Resin Compostion" (Abstract Only).

(Continued)

Primary Examiner—Tae H. Yoon

(57) ABSTRACT

A syndiotactic polystyrene blend comprises syndiotactic polystyrene and poly(arylene ether) wherein the poly (arylene ether) has an intrinsic viscosity less than about 0.25 deciliters per gram (dl/g) when measured in chloroform at 25° C.

16 Claims, 2 Drawing Sheets

U.S. PATENT DOCUMENTS

| | | | |
|---|---|---|---|
| 6,013,709 | A | 1/2000 | Masuyama et al. |
| 6,031,049 | A | 2/2000 | Chino et al. |
| 6,048,932 | A | 4/2000 | Okada et al. |
| 6,063,872 | A | 5/2000 | Nichols et al. |
| 6,071,643 | A | 6/2000 | Chino et al. |
| 6,093,771 | A | 7/2000 | Wunsch et al. |
| 6,160,714 | A | 12/2000 | Green |
| 6,214,909 | B1 | 4/2001 | Masuyama |
| 6,221,939 | B1 | 4/2001 | Campbell et al. |
| 6,228,912 | B1 | 5/2001 | Campbell et al. |
| 6,239,217 | B1 | 5/2001 | Bank et al. |
| 6,306,537 | B2 | 10/2001 | Schubert |
| 6,326,099 | B1 | 12/2001 | Schubert |
| 6,348,540 | B1 | 2/2002 | Sugioka et al. |
| 6,420,483 | B1 | 7/2002 | Mc Kee et al. |
| 6,469,098 | B1 * | 10/2002 | Okada et al. ............... 525/66 |
| 6,596,096 | B2 * | 7/2003 | Carl et al. ............... 148/101 |
| 2001/0025082 | A1 | 9/2001 | Park |
| 2002/0035208 | A1 | 3/2002 | Iwashita et al. |
| 2002/0042474 | A1 | 4/2002 | Court et al. |
| 2003/0130403 | A1 | 7/2003 | Geprags et al. ............ 524/494 |
| 2003/0134964 | A1 | 7/2003 | Geprags et al. ............ 524/502 |

OTHER PUBLICATIONS

JP11181225. Publication Date. Jul. 6, 1999. Abstract Only.
JP2092947. Publication Date. Apr. 3, 1990. Abstract Only.
DE 10003509. Publication Date: Aug. 2, 2001. Abstract Only. 1 page.
DE 10003511. Publication Date: Aug. 2, 2001. Abstract Only. 1 page.
DE 19814352. Publication Date: Oct. 7, 1999. Abstract Only. 1 page.
DE 19836621. Publication Date: Feb. 17, 2000. Abstract Only. 1 page.
DE 19910339. Publication Date: Sep. 14, 2000. Abstract Only. 1 page.
DE 19951679. Publication Date: Jul. 16, 2002. Abstract Only. 1 page.
EP 0266773. Publication Date; May 11, 1988. Abstract Only. 1 page.
EP 0356857. Publication Date: Mar. 7, 1990. Abstract Only. 1 page.
EP 0422495. Publication Date: Apr. 17, 1991. Abstract Only. 1 page.
EP 0608007. Publication Date: Jul. 27, 1994. Abstract Only. 1 page.
EP 0611882. Publication Date: Aug. 24, 1994. Abstract Only. 1 page.
EP 0924254. Publication Date: Jun. 23, 1999. Abstract Only. 1 Page.
EP 0978536. Publication Date: Feb. 9, 2000. Abstract Only. 1 Page.
EP 1118639. Publication Date: Jul. 25, 2001. Abstract Only. 1 Page.
EP 1167439. Publication Date: Apr. 11, 2002. Abstract Only. 1 Page.
JP 1182344. Publication Date: Jul. 20, 1989. Abstract Only. 1 Page.
JP 1182350. Publication Date: Jul. 20, 1989. Abstract Only. 1 Page.
JP 2064140. Publication Date: Mar. 5, 1990. Abstract Only. 1 Page.
JP 2092948. Publication Date: Apr. 3, 1990. Abstract Only. 1 Page.
JP 2218724. Publication Date: Aug. 31, 1990. Abstract Only. 1 Page.
JP 3126743. Publication Date: May 29, 1991. Abstract Only. 1 Page.
JP 5086296. Publication Date: Sep. 2, 1990. Abstract Only. 1 Page.
JP 5209098. Publication Date: Aug. 20, 1993. Abstract Only. 1 Page.
JP 5279530. Publication Date: Oct. 26, 1993. Abstract Only. 1 Page.
JP 6093151. Publication Date: Mar. 16, 1994. Abstract Only. 1 Page.
JP 6116454. Publication Date: Apr. 26, 1994. Abstract Only. 1 Page.
JP 6275929. Publication Date: Sep. 30, 1994. Abstract Only. 1 Page.
JP 7053815. Publication Date: Feb. 28, 1995. Abstract Only. 1 Page.
JP 7062175. Publication Date: Mar. 7, 1995. Abstract Only. 1 Page.
JP 7138433. Publication Date: May 30, 1995. Abstract Only. 1 Page.
JP 7196868. Publication Date: Aug. 1, 1995. Abstract Only. 1 Page.
JP 7292184. Publication Date: Nov. 7, 1995. Abstract Only. 1 Page.
JP 7331003. Publication Date: Dec. 19, 1995. Abstract Only. 1 Page.
JP 8020671. Publication Date: Jan. 23, 1996. Abstract Only. 1 Page.
JP 8048841. Publication Date: Feb. 20, 1996. Abstract Only. 1 Page.
JP 8143699. Publication Date: Jun. 4, 1996. Abstract Only. 1 Page.
JP 8157668. Publication Date: Jun. 18, 1996. Abstract Only. 1 Page.
JP 8311196. Publications Date: May 7, 1997. Abstract Only. 1 Page.
JP 9052958. Publication Date: Feb. 25, 1997. Abstract Only. 1 Page.
JP 9052959. Publication Date: Feb. 25, 1997. Abstract Only. 1 Page.
JP 9077935. Publication Date: Mar. 25, 1997. Abstract Only. 1 Page.
JP 9087477. Publication Date: Mar. 31, 1997. Abstract Only. 1 Page.
JP 9100377. Publication Date: Apr. 15, 1997. Abstract Only. 1 Page.
JP 10046025. Publication Date: Feb. 17, 1998. Abstract Only. 1 Page.
JP 10067899. Publication Date: Mar. 10, 1998. Abstract Only. 1 Page.
JP 10130444. Publication Date: May 19, 1998. Abstract Only. 1 Page.
JP 11116794. Publication Date: Apr. 27, 1999. Abstract Only. 1 Page.
JP 11119011. Publication Date: Apr. 30, 1999. Abstract Only. 1 Page.
JP 11166115. Publication Date: Jun. 22, 1999. Abstract Only. 1 Page.
JP 11181195. Publication Date: Jul. 6, 1999. Abstract Only. 1 Page.
JP 1181225. Publication Date: Jul. 19, 1989. Abstract Only. 1 Page.

JP 11268470. Publication Date: Oct. 5, 1999. Abstract Only. 1 Page.
JP 11279348. Publication Date: Oct. 12, 1999. Abstract Only. 1 Page.
JP 11279349. Publication Date: Oct. 12, 1999. Abstract Only. 1 Page.
JP 1245052. Publication Date: Sep. 29, 1989. Abstract Only. 1 Page.
JP 62104818. Publication Date: May 15, 1987. Abstract Only. 1 Page.
JP 63268709. Publication Date: Nov. 7, 1988. Abstract Only. 1 Page.
JP 2000063663. Publication Date: Feb. 29, 2000. Abstract Only. 1 Page.
JP 2000063664. Publication Date: Feb. 29, 2000. Abstract Only. 1 Page.
JP 2000067829. Publication Date: Mar. 3, 2000. Abstract Only. 1 Page.
JP 2000073992. Publication Date: Mar. 7, 2000. Abstract Only. 1 Page.
JP 2000080228. Publication Date: Mar. 31, 2000. Abstract Only. 1 Page.
JP 2000086844. Publication Date: Mar. 28, 2000. Abstract Only. 1 Page.
JP 2000086845. Publication Date: Mar. 28, 2000. Abstract Only. 1 Page.
JP 2000143891. Publication Date: May 26, 2000. Abstract Only. 1 Page.
JP 2000191868. Publication Date: July 11, 2000. Abstract Only. 1 Page.
JP 2000265021. Publication Date: Sep. 26, 2000. Abstract Only. 1 Page.
JP 2000281849. Publication Date: Oct. 10, 2000. Abstract Only. 1 Page.
JP 2001031818. Publication Date: Feb. 6, 2001. Abstract Only. 1 Page.
JP 2001053422. Publication Date: February 23, 2001. Abstract Only. 1 Page.
JP 2001072814. Publication Date: Jun. 11, 2002. Abstract Only. 1 Page.
JP 2001185853. Publication Date: Jul. 6, 2001 Abstract Only. 1 Page.
WO 9304119. Publication Date: Mar. 4, 1993. Abstract Only. 1 Page.
International Search Report dated Sep. 12, 2003.
JP 8143729. Publication Date Jun. 4, 1996. Abstract Only.
JP 9031276. Publication Date Feb. 4, 1997. Abstract Only.
JP 10017740. Publication Date Jan. 20, 1998. Abstract Only.

* cited by examiner

SYNDIOTACTIC POLYSTYRENE BLENDS

BACKGROUND OF INVENTION

The disclosure relates to blends of syndiotactic polystyrene and poly(arylene ether).

Syndiotactic polystyrene has excellent heat and chemical resistance, apparently due to its crystalline morphology. Poly(arylene ether) is highly miscible with syndiotactic polystyrene, however the presence of poly(arylene ether) can compromise the level and rate of syndiotactic polystyrene crystallization. A decrease in crystallinity can in turn decrease both heat and chemical resistance.

Additionally, syndiotactic polystyrene has a small temperature processing window due to the fact that the melt temperature and the degradation temperature are typically only about thirty degrees apart. Attempts have been made to ameliorate the small processing window through the inclusion of additives, particularly flow promoters, to enhance processability of the syndiotactic polystyrene. These additives can decrease some of the desirable physical characteristics of the syndiotactic polystyrene such as chemical resistance, moisture resistance and heat distortion temperature.

SUMMARY OF INVENTION

A syndiotactic polystyrene blend comprises syndiotactic polystyrene and poly(arylene ether) wherein the poly (arylene ether) has an intrinsic viscosity less than about 0.25 deciliters per gram (dl/g) when measured in chloroform at 25° C.

DETAILED DESCRIPTION

Figure 1:
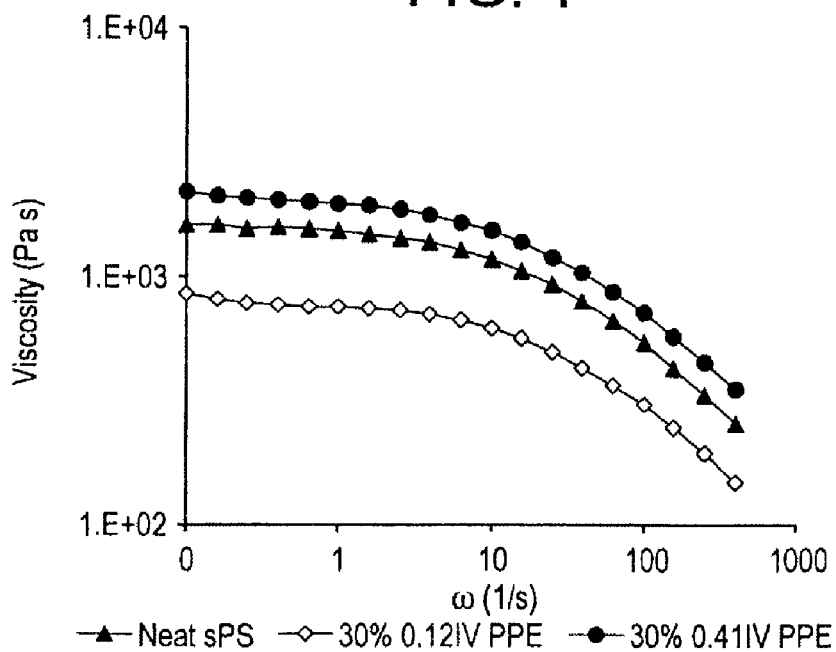
FIG. 1 is a graph comparing the viscosity of syndiotactic polystyrene and syndiotactic polystyrene blends.

A syndiotactic polystyrene blend comprises syndiotactic polystyrene and poly(arylene ether) wherein the poly (arylene ether) has an intrinsic viscosity less than about 0.25 deciliters per gram (dl/g) when measured in chloroform at 25° C. The syndiotactic polystyrene blend has a lower melt viscosity than syndiotactic polystyrene thereby decreasing the amount of degradation during processing. The syndiotactic polystyrene blend preferably has a melt viscosity less than or equal to about 95%, more preferably less than or equal to about 90%, and most preferably less than or equal to about 85% of the melt viscosity of the syndiotactic polystyrene. The lower melt viscosity can result in shorter processing times as well as decrease shear heating.

Syndiotactic polystyrene blends employing low intrinsic viscosity poly(arylene ether) demonstrate a higher level of crystallinity than comparable syndiotactic polystyrene blends employing high intrinsic viscosity poly(arylene ether). As used herein low intrinsic viscosity poly(arylene ether) is defined as a poly(arylene ether) having an intrinsic viscosity less than about 0.25 dl/g when measured in chloroform at 25° C. High intrinsic viscosity poly(arylene ether) is defined as a poly(arylene ether) having an intrinsic viscosity greater than about 0.25 dl/g when measured in chloroform at 25° C.

Syndiotactic polystyrene blends comprising low intrinsic viscosity poly(arylene ether) preferably have greater than or equal to about 30% crystallinity, more preferably greater than or equal to about 40% crystallinity and most preferably greater than or equal to about 50% crystallinity. Unlike syndiotactic polystyrene blends with high intrinsic viscosity poly(arylene ether), blends with low intrinsic viscosity poly (arylene ether) can have high levels of crystallinity even with rapid cooling rates. High levels of crystallinity are desirable in that levels of crystallinity are generally directly associated with levels of chemical resistance and dimensional stability at elevated temperatures. Additionally, when the low intrinsic viscosity poly(arylene ether) is functionalized the syndiotactic polystyrene blend exhibits better adhesion to filler material and improved compatibility and morphology with other thermoplastics such as polyamides.

Syndiotactic polystyrene is polystyrene with a highly regular stereochemical structure, that is to say, a highly syndiotactic configuration. In other words, the phenyl groups and substituted phenyl groups of the side groups are alternately located at opposite positions with respect to the main polymer chain. The tacticity in the stereochemical structure is quantitatively determined by measurement of the nuclear magnetic resonance (NMR) using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. A syndiotactic polystyrene is herein defined as a polystyrene, poly (alkylstyrene), poly(halogenated styrene), poly(halogenated alkylstyrene), poly(alkoxystyrene), poly(vinylbenzoic acid ester), hydrogenated derivative of these polymers, mixtures comprising one of the foregoing polymers, or a copolymer containing constituting units of these polymers as the main components, which generally has the syndiotacticity of 75% or more, preferably 85% or more, expressed in terms of the content of the racemic diad, or 30% or more, preferably 50% or more, expressed in terms of the content of the racemic pentad.

Examples of poly(alkylstyrene) include, but are not limited to, poly(methylstyrene), poly(ethylstyrene), poly (isopropylstyrene), poly(tertiary-butylstyrene), poly (phenylstyrene), poly(vinylnaphthalene), and poly (vinylstyrene). Examples of the poly (halogenated styrene) include poly(chlorostyrene), poly(bromostyrene), and poly (fluorostyrene). Examples of the poly-(halogenated alkylstyrene) include poly (chloromethylstyrene). Examples of the poly(alkoxystyrene) include poly (methoxystyrene) and poly(ethoxystyrene).

Particularly preferable examples of syndiotactic polystyrene include polystyrene, poly(p-methylstyrene), poly(m-methylstyrene), poly(p-tertiary-butylstyrene), poly(p-chlorostyrene), poly(m-chlorostyrene), poly(p-fluorostyrene), hydrogenated polystyrene, copolymers containing comprising units of the above polymers and combinations comprising one of the foregoing syndiotactic polystyrenes.

The molecular weight of the styrenic polymer is not particularly limited. The weight-average molecular weight is preferably greater than or equal to about 10,000, and preferably greater than or equal to about 50,000. The molecular weight distribution is not particularly limited, and syndiotactic polystyrene having various molecular weight distributions can be used.

Syndiotactic polystyrene can be produced by polymerizing a styrenic monomer (a monomer corresponding to the repeating unit in syndiotactic polystyrene) in an inert hydrocarbon solvent or in the absence of solvents by using a titanium compound and a condensation product of water and trialkylaluminum as the catalyst.

Syndiotactic polystyrene is typically employed in amounts of greater than or equal to about 40, preferably greater than or equal to about 50, and more preferably greater than or equal to about 70 weight percent (wt %), and in amounts less than or equal to about 99, preferably less than or equal to about 98, and more preferably less than or equal to about 95 wt %, based on the total weight of the blend.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly (arylene ether), and the like; and combinations comprising at least one of the foregoing. Poly(arylene ether)s per se, are known polymers comprising a plurality of structural units of the formula (I):

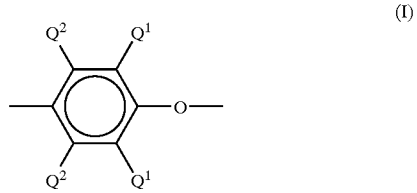

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly (arylene ether)s of the present invention further includes combinations comprising at least one of the above.

The poly(arylene ether) generally has a number average molecular weight of about 2,000 to about 12,000 atomic mass units (amu) and a weight average molecular weight of about 5,000 to about 25,000 amu, as determined by gel permeation chromatography. The poly(arylene ether) has an intrinsic viscosity less than about 0.25 deciliters per gram (dl/g), preferably less than about 0.15 dl/g, and more preferably less than about 0.12 dl/g as measured in chloroform at 25° C.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

The polyphenylene ether copolymers may also have various end groups, such as amino alkyl containing end groups and 4-hydroxy biphenyl end groups, typically incorporated during synthesis by the oxidative coupling reaction. The polyphenylene ether resins may be functionalized or "capped" with end groups, which add further reactivity to the polymer and in some instances provide additional compatibility with additives and other polymer resins that may be used to produce an alloy or blend. For instance, the polyphenylene ether may be functionalized with an epoxy end group, a phosphate end group, an acrylate or methacrylate end group, or an ortho ester end group by reacting the polyphenylene ether copolymer with functionalizing agents known in the art.

It will be apparent to those skilled in the art from the foregoing that the contemplated poly(arylene ether) includes all those presently known, irrespective of variations in structural units or ancillary chemical features.

Poly(arylene ether) is typically employed in amounts of greater than or equal to about 1, preferably greater than or equal to about 2, and more preferably greater than or equal to about 5 wt %, and in amounts less than or equal to about 60, preferably less than or equal to about 50, and more preferably less than or equal to about 30 wt %, based on the total weight of the blend.

The syndiotactic polystyrene blend may further comprise one or more fillers, including low-aspect ratio fillers, fibrous fillers, and polymeric fillers. Non-limiting examples of fillers include silica powder, such as fused silica, crystalline silica, natural silica sand, and various silane-coated silicas; boron-nitride powder and boron-silicate powders; alumina and magnesium oxide (or magnesia); wollastonite including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; talc, including fibrous, modular, needle shaped, and lamellar talcs; glass spheres, both hollow and solid, and surface-treated glass spheres typically having coupling agents such as silane coupling agents and/or containing a conductive coating; kaolin, including hard, soft, calcined kaolin, and kaolin comprising various coatings known to the art to facilitate the dispersion and compatibility; mica, including metallized mica and mica surface treated with aminosilanes or acryloylsilanes coatings; feldspar and nepheline syenite; silicate spheres; flue dust; cenospheres; finite; aluminosilicate (armospheres), including silanized and metallized aluminosilicate; quartz; quartzite; perlite;

diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; carbon black, including conductive carbon black; graphite, such as graphite powder; flaked fillers and reinforcements such as glass flakes, flaked silicon carbide, aluminum diboride, aluminum flakes, and steel flakes; processed mineral fibers such as those derived from blends comprising at least one of aluminum silicates, aluminum oxides, magnesium oxides, and calcium sulfate hemihydrate; natural fibers including wood flour, cellulose, cotton, sisal, jute, starch, cork flour, lignin, ground nut shells, and grain husks; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers, boron fibers, ceramic fibers such as silicon carbide, and fibers from mixed oxides of aluminum, boron and silicon; single crystal fibers or "whiskers" including silicon carbide fibers, alumina fibers, boron carbide fibers, iron fibers, nickel fibers, copper fibers; glass fibers, including textile glass fibers such as E, A, C, ECR, R, S, D, and NE glasses, and quartz; and vapor-grown carbon fibers include those having an average diameter of about 3.5 to about 500 nanometers as described in, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahasset al. A preferred filler is glass fibers.

Fillers, when present, are typically employed in amounts of greater than or equal to about 1, preferably greater than or equal to about 5, and more preferably greater than or equal to about 10 wt %, and in amounts less than or equal to about 50, preferably less than or equal to about 40, and more preferably less than or equal to about 30 wt %, based on the total weight of the composition.

The syndiotactic polystyrene blend may further comprise an impact modifier. Particularly suitable thermoplastic impact modifiers are block copolymers, for example, A-B diblock copolymers and A-B-A triblock copolymers having of one or two alkenyl aromatic blocks A, which are typically styrene blocks, and a rubber block, B, which is typically an isoprene or butadiene block. The butadiene block may be partially hydrogenated. Mixtures of these diblock and triblock copolymers are especially useful.

Suitable A-B and A-B-A copolymers include but are not limited to polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as the selectively hydrogenated versions thereof, and the like. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

Impact modifiers are typically employed in amounts of greater than or equal to about 1, preferably greater than or equal to about 5, and more preferably greater than or equal to about 10 wt %, and in amounts less than or equal to about 50, preferably less than or equal to about 40, and more preferably less than or equal to about 30 wt %, based on the total weight of the composition.

The syndiotactic polystyrene blend can optionally contain various additives, such as antioxidants, such as, for example, organophosphites, for example, tris(nonyl-phenyl) phosphite, tris(2,4-di-t-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)] methane, 3,5-di-tert-butyl-4-hydroxyhydrocinnamate octadecyl, 2,4-di-tert-butylphenyl phosphite, butylated reaction products para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, amides of beta-(3,5-di-tert-butyl-4-hydroxyphenyl)-propionic acid; and other additives such as, for example, mold release agents, UV absorbers, stabilizers such as light stabilizers and others, lubricants, plasticizers, pigments, dyes, colorants, anti-static agents, blowing agents, flame retardants, among others.

The syndiotactic polystyrene, low intrinsic viscosity poly(arylene ether) and other optional components are combined and mixed to form an intimate blend. The method of mixing is not limited in any particular way, such as by order of addition. The mixture is preferably heated to a temperature above the melt temperature and below the degradation temperature of the syndiotactic polystyrene. The syndiotactic polystyrene blend may be formed into pellets and later used to form articles or may be immediately processed into articles. When forming an article from the syndiotactic polystyrene blend the article may be cooled rapidly without significant loss of crystallinity. Rapid cooling is herein defined as decreasing the temperature by greater than about 50° C. per minute.

All patents cited are herein incorporated by reference. This invention is further illustrated by the following examples, which are not intended to be limiting.

EXAMPLE 1

Syndiotactic polystyrene with a weight average molecular weight (Mw) of 250,000 atomic mass units was combined with 30 weight percent (wt %) of poly(arylene ether)s having an intrinsic viscosity of either 0.12 dl/g or 0.40 dl/g. Melt viscosity was then measured using by parrallel plate dynamic viscometry at 280° C. As can be seen in FIG. 1, the blend containing poly(arylene ether) with an intrinsic viscosity of 0.40 dl/g has a higher melt viscosity than unblended syndiotactic polystyrene while the blend containing poly(arylene ether) with an intrinsic viscosity of 0.12 dl/g has a melt viscosity less than the unblended syndiotactic polystyrene.

EXAMPLE 2

Figure 2:
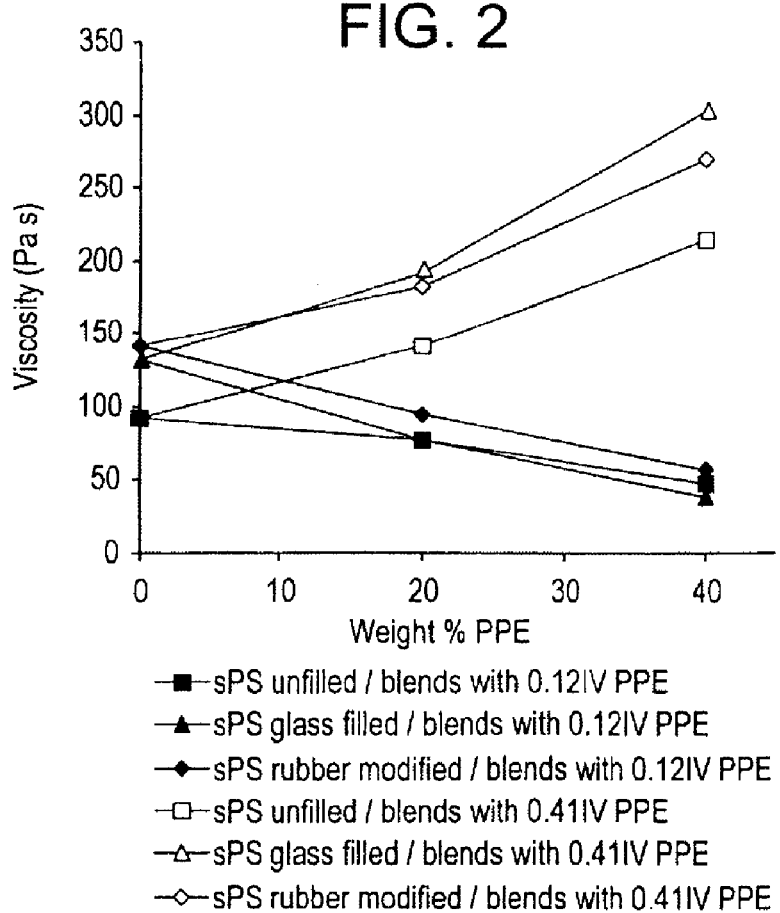
FIG. 2 is a graph showing the relationship between viscosity and the amount of poly(arylene ether) present in a syndiotactic polystyrene blend.

Syndiotactic polystyrene, syndiotactic polystyrene containing 30 wt % glass filler, and syndiotactic polystyrene comprising an impact modifier were combined with poly(arylene ether) having an intrinsic viscosity of 0.12 dl/g or 0.40 dl/g in varying amounts. Capillary viscosity was measured at 290° C. As can be seen in FIG. 2 blends comprising poly(arylene ether) having an intrinsic viscosity of 0.12 dl/g have a significantly lower viscosity than syndiotactic polystyrene or blends of syndiotactic polystyrene and poly(arylene ether) having an intrinsic viscosity of 0.40 dl/g.

EXAMPLE 3

Figure 3:
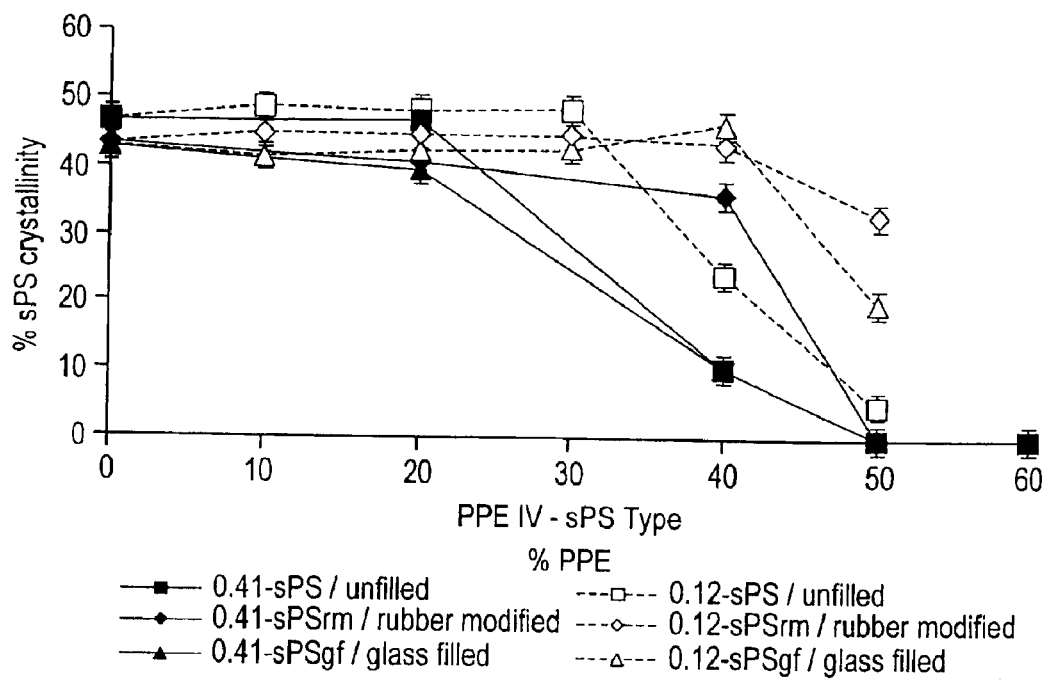
FIG. 3 is a graph showing the relationship between the amount of poly(arylene ether) in a syndiotactic polystyrene blend and the amount of crystallinity.

Syndiotactic polystyrene, syndiotactic polystyrene containing 30 wt % glass filler, and syndiotactic polystyrene comprising an impact modifier were combined with poly(arylene ether) having an intrinsic viscosity of 0.12 dl/g or 0.40 dl/g in varying amounts. Blends as well as the syndiotactic polystyrene were recrystallized from the melt at a controlled cooling rate of 20° C./minute. Crystallinity was measured by differential scanning calorimetry (DSC). The results shown in FIG. 3 indicate that at a given level of poly(arylene ether), blends comprising poly(arylene ether) having an intrinsic viscosity of 0.12 dl/g have a higher level of crystallinity than blends comprising poly(arylene ether) having an intrinsic viscosity of 0.40 dl/g. This difference is especially noticeable in blends comprising filler and in blends comprising greater than 30 wt % of poly(arylene ether).

EXAMPLE 4

Figure 4:
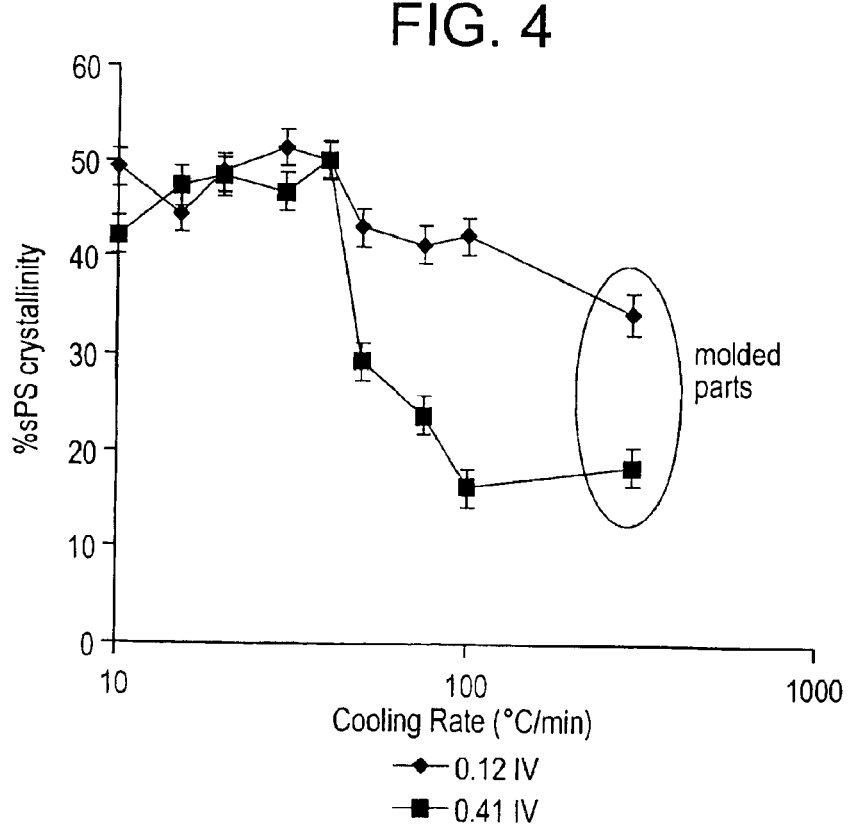
FIG. 4 is a graph showing the relationship between crystallinity and cooling rate in syndiotactic polystyrene blends containing high intrinsic viscosity poly(arylene ether) or low intrinsic viscosity poly(arylene ether).

Blends comprising syndiotactic polystyrene and 20 wt % of poly(arylene ether) having an intrinsic viscosity of 0.12 dl/g or 20 wt % of poly(arylene ether) having an intrinsic viscosity of 0.40 dl/g. These blends were then recrystallized from melt at varying rates and the resulting amount of crystallinity measured by DSC. As seen in FIG. 4 blends containing poly(arylene ether) having an intrinsic viscosity of 0.12 dl/g have greater crystallinity than blends containing poly(arylene ether) having an intrinsic viscosity of 0.40 dl/g at rapid cooling rates.

As can be seen from the foregoing examples, syndiotactic polystyrene blends comprising low viscosity poly(arylene ether) have lower viscosity than syndiotactic polystyrene or blends of syndiotactic polystyrene and high viscosity poly(arylene ether). Additionally, blends comprising low viscosity poly(arylene ether) have higher crystallinity than blends comprising high viscosity poly(arylene ether).

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. A syndiotactic polystyrene blend comprising syndiotactic polystyrene and poly(arylene ether) wherein the poly(arylene ether) has an intrinsic viscosity less than about 0.25 deciliter per gram (dl/g) when measured in chloroform at 25° C. and the syndiotactic polystyrene blend has a melt viscosity less than or equal to about 95% of the melt viscosity of the syndiotactic polystyrene.

2. The blend of claim 1, wherein the blend has greater than or equal to about 30% crystallinity.

3. The blend of claim 1, wherein the poly(arylene ether) is functionalized.

4. The blend of claim 1, wherein the syndiotactic polystyrene has a syndiotacticity of 30% or more, expressed in terms of the content of the racemic pentad.

5. The blend of claim 1, wherein the syndiotactic polystyrene has a syndiotacticity of 75% or more, expressed in terms of the content of the racemic diad.

6. The blend of claim 1, wherein the syndiotactic polystyrene has a weight average molecular weight greater than about 10,000.

7. The blend of claim 1, wherein the syndiotactic polystyrene is present in an amount of about 40 to about 99 weight percent, based on the total weight of the blend.

8. The blend of claim 1, wherein the poly(arylene ether) has an intrinsic viscosity less than or equal to about 0.15 dl/g as measured in chloroform at 25° C.

9. The blend of claim 1, wherein the poly(arylene ether) is present in an amount of about 1 to about 60 weight percent, based on the total weight of the blend.

10. The blend of claim 1, further comprising filler.

11. The blend of claim 10, wherein the filler comprises glass fiber.

12. The blend of claim 10, wherein the filler is present in an amount of about 1 to about 50 weight percent, based on the total weight of the composition.

13. The blend of claim 1, further comprising an impact modifier.

14. The blend of claim 13, wherein the impact modifier is present in an amount of about 1 to about 50 weight percent, based on the total weight of the composition.

15. A syndiotactic polystyrene blend comprising syndiotactic polystyrene and poly(arylene ether) wherein the poly(arylene ether) has an intrinsic viscosity less than about 0.15 deciliter per gram (dl/g) when measured in chloroform at 25° C. and the syndiotactic polystyrene blend has greater than or equal to about 30% crystallinity.

16. A syndiotactic polystyrene blend comprising syndiotactic polystyrene and poly(arylene ether) wherein the poly(arylene ether) has an intrinsic viscosity less than about 0.15 deciliter per gram (dl/g) when measured in chloroform at 25° C. and the syndiotactic polystyrene blend has a melt viscosity less than or equal to about 95% of the melt viscosity of syndiotactic polystyrene.

* * * * *

UNITED STATES PATENT AND TRADEMARK OFFICE
CERTIFICATE OF CORRECTION

PATENT NO. : 6,894,102 B2 Page 1 of 1
DATED : May 17, 2005
INVENTOR(S) : Glen David Merfeld It is certified that error appears in the above-identified patent and that said Letters Patent is hereby corrected as shown below:

Title page,
Item [73], Assignee, delete "Pittsfield, MA" and insert -- Schenectady, NY --.

Column 3,
Line 66, after "further" delete "includes" and insert -- include --.

Column 5,
Line 33, before "al." delete "Nahasset" and insert -- Nahass et --.
Line 45, before "one" delete "of".

Column 6,
Line 16, after "products" insert -- of --.
Line 55, after "by" delete "parrallel" and insert -- parallel --.

Column 7,
Line 54, after "not" delete "limitations" and insert -- limitation --.

Signed and Sealed this

Sixteenth Day of May, 2006

JON W. DUDAS
*Director of the United States Patent and Trademark Office*